United States Patent [19]
Stevens

[11] Patent Number: 6,056,345
[45] Date of Patent: May 2, 2000

[54] WAGON LINER

[76] Inventor: Sherry L. Stevens, 8110 SW. 11th St., North Lauderdale, Fla. 33068

[21] Appl. No.: 09/065,210

[22] Filed: Apr. 23, 1998

[51] Int. Cl.[7] .................................................... B60R 13/01
[52] U.S. Cl. ........................................... 296/39.2; 296/180
[58] Field of Search ................... 296/39.1, 39.2, 296/177, 180; 105/423; 220/23.87, 23.91

[56] References Cited

U.S. PATENT DOCUMENTS

| D. 248,386 | 7/1978 | Hefner | 296/39.2 X |
|---|---|---|---|
| 1,059,058 | 4/1913 | McDonald | 296/39.1 |
| 1,151,972 | 8/1915 | Skreberg | 296/39.1 |
| 4,575,146 | 3/1986 | Markos | 296/39.2 |
| 4,986,590 | 1/1991 | Patti et al. | 296/39.2 |
| 5,221,119 | 6/1993 | Emery | 296/39.2 |
| 5,540,473 | 7/1996 | Bills, Sr. | 296/39.2 |

FOREIGN PATENT DOCUMENTS

| 1246867 | 10/1960 | France | 296/39.2 |
|---|---|---|---|

*Primary Examiner*—Dennis H. Pedder

[57] ABSTRACT

A new wagon liner for mounting to a child's wagon. The inventive device includes a bottom panel with a perimeter side wall extending from the upper surface of the bottom panel around the outer perimeter of the bottom panel. A lip outwardly extends from the terminal edge of the perimeter side wall and which is adapted to hold a portion of a wall of a wagon between the lip and the perimeter side wall.

6 Claims, 2 Drawing Sheets

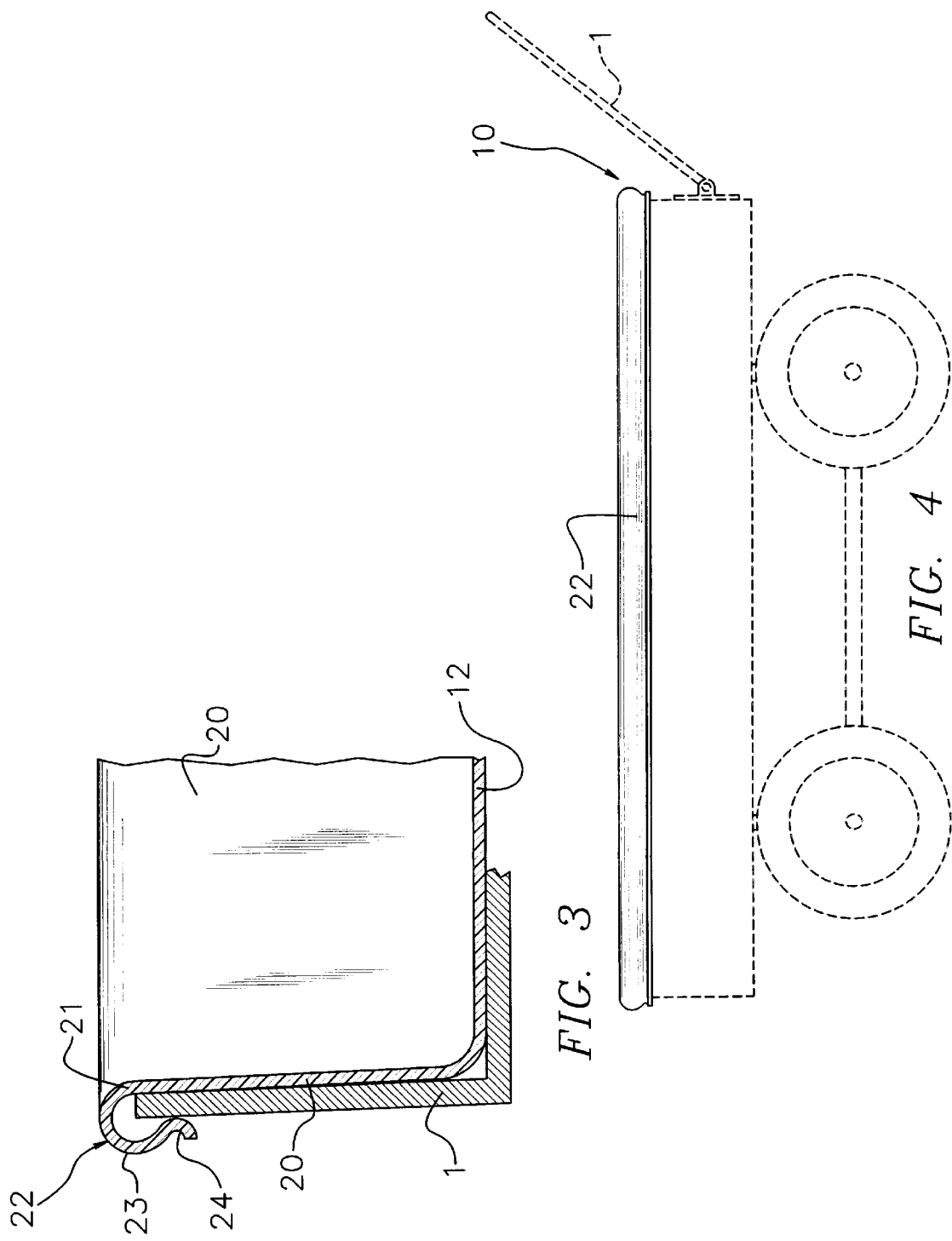

WAGON LINER

BACKGROUND OF THE INVENTION

1. Field of the Invention

The present invention relates to accessories for children's wagons and more particularly pertains to a new wagon liner for mounting to a child's wagon.

2. Description of the Prior Art

The use of accessories for children's wagons is known in the prior art. More specifically, accessories for children's wagons heretofore devised and utilized are known to consist basically of familiar, expected and obvious structural configurations, notwithstanding the myriad of designs encompassed by the crowded prior art which have been developed for the fulfillment of countless objectives and requirements.

Known prior art accessories for children's wagons include U.S. Pat. Nos. 5,308,133; 5,207,472; 4,958,876; 4,986,590; U.S. Pat. No. Des. 333,112; and U.S. Pat. No. Des. 275,691.

While these devices fulfill their respective, particular objectives and requirements, the aforementioned patents do not disclose a new wagon liner. The inventive device includes a bottom panel with a perimeter side wall extending from the upper surface of the bottom panel around the outer perimeter of the bottom panel. A lip outwardly extends from the terminal edge of the perimeter side wall and which is adapted to hold a portion of a wall of a wagon between the lip and the perimeter side wall.

In these respects, the wagon liner according to the present invention substantially departs from the conventional concepts and designs of the prior art, and in so doing provides an apparatus primarily developed for the purpose of mounting to a child's wagon.

SUMMARY OF THE INVENTION

In view of the foregoing disadvantages inherent in the known types of accessories for children's wagons now present in the prior art, the present invention provides a new wagon liner construction wherein the same can be utilized for mounting to a child's wagon.

The general purpose of the present invention, which will be described subsequently in greater detail, is to provide a new wagon liner apparatus and method which has many of the advantages of the accessories for children's wagons mentioned heretofore and many novel features that result in a new wagon liner which is not anticipated, rendered obvious, suggested, or even implied by any of the prior art accessories for children's wagons, either alone or in any combination thereof.

To attain this, the present invention generally comprises a bottom panel with a perimeter side wall extending from the upper surface of the bottom panel around the outer perimeter of the bottom panel. A lip outwardly extends from the terminal edge of the perimeter side wall and which is adapted to hold a portion of a wall of a wagon between the lip and the perimeter side wall.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wagon liner apparatus and method which has many of the advantages of the accessories for children's wagons mentioned heretofore and many novel features that result in a new wagon liner which is not anticipated, rendered obvious, suggested, or even implied by any of the prior art accessories for children's wagons, either alone or in any combination thereof.

It is another object of the present invention to provide a new wagon liner which may be easily and efficiently manufactured and marketed.

It is a further object of the present invention to provide a new wagon liner which is of a durable and reliable construction.

An even further object of the present invention is to provide a new wagon liner which is susceptible of a low cost of manufacture with regard to both materials and labor, and which accordingly is then susceptible of low prices of sale to the consuming public, thereby making such wagon liner economically available to the buying public.

Still yet another object of the present invention is to provide a new wagon liner which provides in the apparatuses and methods of the prior art some of the advantages thereof, while simultaneously overcoming some of the disadvantages normally associated therewith.

Still another object of the present invention is to provide a new wagon liner for mounting to a child's wagon.

Yet another object of the present invention is to provide a new wagon liner which includes a bottom panel with a perimeter side wall extending from the upper surface of the bottom panel around the outer perimeter of the bottom panel. A lip outwardly extends from the terminal edge of the perimeter side wall and which is adapted to hold a portion of a wall of a wagon between the lip and the perimeter side wall.

Still yet another object of the present invention is to provide a new wagon liner that covers rusty areas on the bed of a child's wagon.

Even still another object of the present invention is to provide a new wagon liner that provides a safe seating area for a child sitting on a child's wagon.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic partial cross sectional view of the present invention in use mounted to the side wall of a wagon.

FIG. 4 is a schematic side view of the present invention in use mounted to a wagon.

DESCRIPTION OF THE PREFERRED EMBODIMENT

Figure 1:
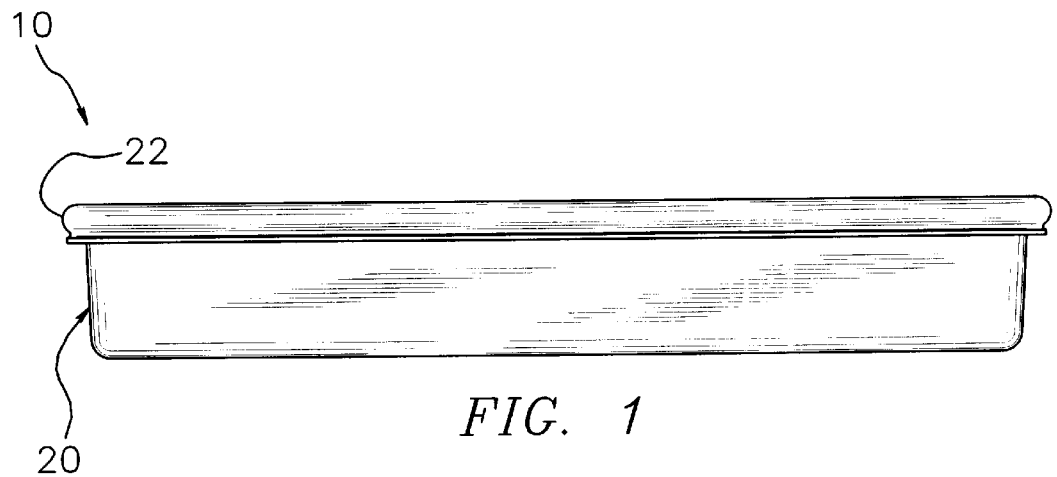
FIG. 1 is a schematic side view of a new wagon liner according to the present invention.
Figure 2:
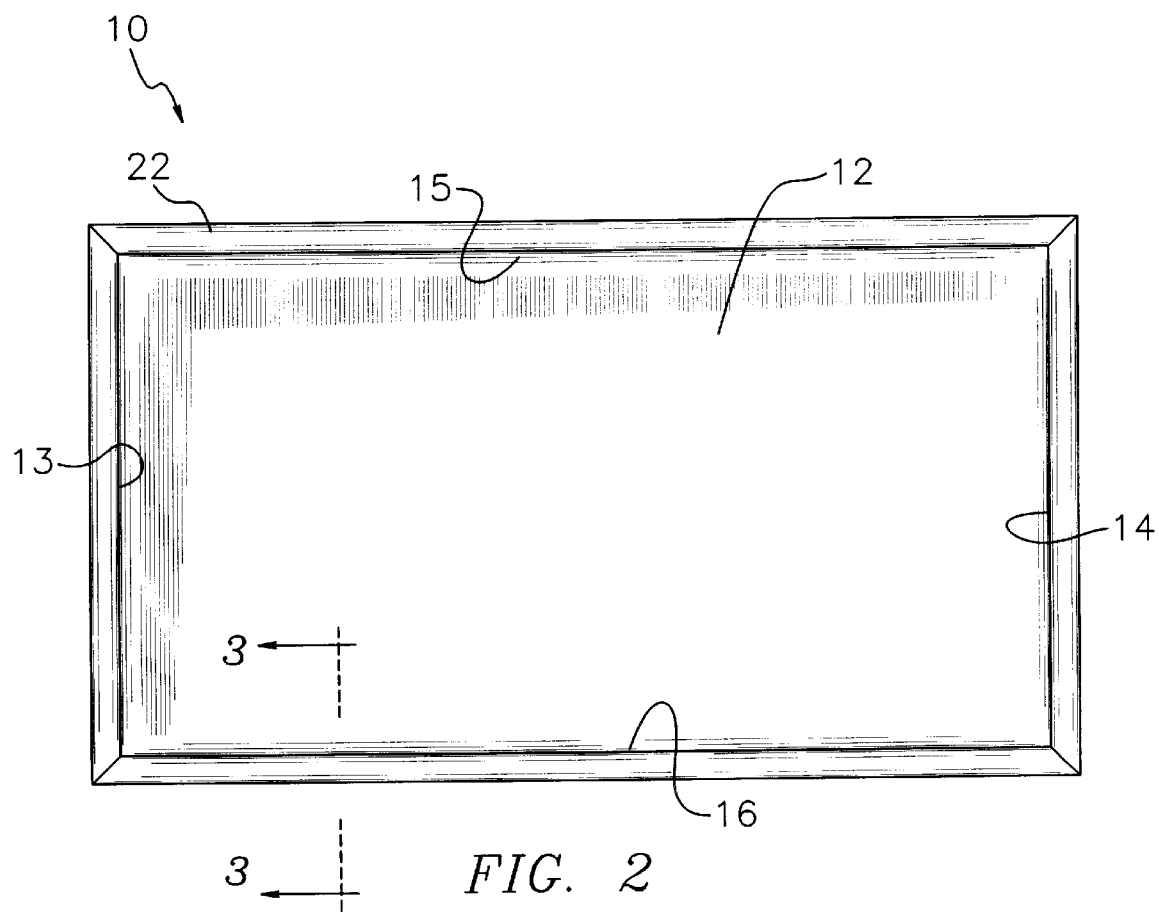
FIG. 2 is a schematic top side view of the present invention.

With reference now to the drawings, and in particular to FIGS. 1 through 4 thereof, a new wagon liner embodying the principles and concepts of the present invention and generally designated by the reference numeral 10 will be described.

The liner 10 is designed for mounting to a child's wagon 1 such as the type known as a Radio Flyer having a load bed, a perimeter wall around the perimeter of the load bed, and ground engaging wheels. As best illustrated in FIGS. 1 through 4, the wagon liner 10 comprises a bottom panel 12 with a perimeter side wall 20 extending from the upper surface of the bottom panel 12 around the outer perimeter of the bottom panel 12. A lip 22 outwardly extends from the terminal edge 21 of the perimeter side wall 20 and which is adapted to hold a portion of a wall of a wagon between the lip 22 and the perimeter side wall 20.

In closer detail, the bottom panel 12 is generally rectangular and has substantially planar upper and lower surfaces. The bottom panel 12 has a pair of opposite ends 13,14 and a pair of sides 15,16 extending between the ends 13,14 which together define the outer perimeter of the bottom panel 12. Ideally the liner comprises plastic. The bottom panel 12 has a length defined between the ends 13,14 of the bottom panel 12 and a width defined between the sides 15,16 of the bottom panel 12. Ideally, the width of the bottom panel 12 is less than about two thirds the length of the bottom panel 12 and greater than about one third the length of the bottom panel 12. Even more ideally, the width of the bottom panel 12 is about half the length of the bottom panel 12.

The perimeter side wall 20 is upwardly extended from the upper surface of the bottom panel 12 around the outer perimeter of the bottom panel 12. The perimeter side wall 20 has a terminal edge 21 which extends away from the upper surface of the bottom panel 12. The perimeter side wall 20 preferably extends substantially perpendicular to the upper surface of the bottom panel 12. The perimeter side wall 20 and the outer perimeter of the bottom panel 12 forms a corner edge at their intersection which is ideally rounded to help prevent injuries that normally occur from sharp corners.

The lip 22 is formed from the terminal edge 21 of the side wall such that the lip 22 outwardly extended from the terminal edge 21 of the perimeter side wall 20. The lip 22 has a portion 23 which curves towards the perimeter side wall 20 to form a space between the lip 22 and the perimeter side wall 20. This portion 23 of the lip 22 is adapted to hold a portion 23 of a wall of a wagon between the lip 22 and the perimeter side wall 20. Preferably, the curved portion 23 of the lip 22 is resiliently deflectable to help hold a portion 23 of a wall of a wagon between the lip 22 and the perimeter side wall 20. Ideally, the portion 23 of the lip 22 has an outwardly curved region 24 with its convexity facing the perimeter side wall 20. The curved region 24 is designed for aiding the easily insertion of a wall of a wagon between the perimeter side wall 20 and the lip 22.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A liner for a wagon having a load bed and a wall around the perimeter of the load bed, said liner comprising:

a bottom panel being generally rectangular and having substantially planar upper and lower surfaces, a pair of opposite ends and a pair of sides being extended between said ends of said bottom panel, said ends and sides of said bottom panel defining an outer perimeter of said bottom panel;

a perimeter side wall being extended from said upper surface of said bottom panel around said outer perimeter of said bottom panel, said perimeter side wall having a terminal edge;

a lip outwardly extended from said terminal edge of said perimeter side wall, said lip being adapted to hold a portion of a wall of a wagon between said lip and said perimeter side wall;

said lip having a portion being curved towards said perimeter side wall to form a space between said lip and said perimeter side wall, said portion of said lip being adapted to pinch a portion of a wall of a wagon between said lip and said perimeter side wall for retaining said perimeter side wall in position with respect to the wall of the wagon; and said curved portion of said lip having a convexity facing said perimeter side wall, said curved portion being for aiding the insertion of a wall of a wagon between said perimeter side wall and said lip.

2. The liner of claim 1, wherein said liner comprises plastic.

3. The liner of claim 1, wherein said bottom panel has a length being defined between said ends of said bottom panel, wherein said bottom panel has a width being defined between said sides of said bottom panel, wherein said width of said bottom panel is less than about two thirds said length of said bottom panel and greater than about one third said length of said bottom panel.

4. The liner of claim 3, wherein said width of said bottom panel is about half said length of said bottom panel.

5. The liner of claim 1, wherein said perimeter side wall is extended substantially perpendicular to said upper surface of said bottom panel.

6. A liner for a wagon having a load bed and a wall around the perimeter of the load bed, said liner comprising:

- a bottom panel being generally rectangular and having substantially planar upper and lower surfaces, a pair of opposite ends and a pair of sides being extended between said ends of said bottom panel, said ends and sides of said bottom panel defining an outer perimeter of said bottom panel;
- wherein said liner comprises plastic;
- wherein said bottom panel has a length being defined between said ends of said bottom panel, wherein said bottom panel has a width being defined between said sides of said bottom panel, wherein said width of said bottom panel is less than about two thirds said length of said bottom panel and greater than about one third said length of said bottom panel;
- a perimeter side wall being extended from said upper surface of said bottom panel around said outer perimeter of said bottom panel, said perimeter side wall having a terminal edge, said perimeter side wall being extended substantially perpendicular to said upper surface of said bottom panel;
- a lip outwardly extended from said terminal edge of said perimeter side wall, said lip having a portion being curved towards said perimeter side wall, said portion of said lip being adapted to pinch a portion of a wall of a wagon between said lip and said perimeter side wall for retaining said perimeter side wall in position with respect to the wall of the wagon; and
- said curved portion of said lip having a convexity facing said perimeter side wall, said curved portion being for aiding the insertion of a wall of a wagon between said perimeter side wall and said lip.

\* \* \* \* \*